(12) United States Patent
Roscoe

(10) Patent No.: US 9,908,289 B2
(45) Date of Patent: Mar. 6, 2018

(54) SYSTEM AND METHOD FOR CORRECTING OBJECT DEFECTS FORMED BY A THREE-DIMENSIONAL OBJECT PRINTING SYSTEM

(71) Applicant: Xerox Corporation, Norwalk, CT (US)

(72) Inventor: Gary W. Roscoe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 314 days.

(21) Appl. No.: 14/644,916

(22) Filed: Mar. 11, 2015

(65) Prior Publication Data

US 2016/0263824 A1    Sep. 15, 2016

(51) Int. Cl.
| | | |
|---|---|---|
| *B29C 67/00* | (2017.01) | |
| *B33Y 50/02* | (2015.01) | |
| *B29C 64/112* | (2017.01) | |
| *B29C 64/386* | (2017.01) | |
| *B33Y 10/00* | (2015.01) | |
| *B33Y 30/00* | (2015.01) | |

(52) U.S. Cl.
CPC ........ *B29C 67/0059* (2013.01); *B29C 64/112* (2017.08); *B29C 64/386* (2017.08); *B33Y 50/02* (2014.12); *B33Y 10/00* (2014.12); *B33Y 30/00* (2014.12)

(58) Field of Classification Search
CPC .................. B29C 67/0059; B29C 67/0088
See application file for complete search history.

(56) References Cited

U.S. PATENT DOCUMENTS

| | | | |
|---|---|---|---|
| 7,658,976 B2 | 2/2010 | Kritchman | |
| 7,962,237 B2 | 6/2011 | Kritchman | |
| 2002/0104973 A1* | 8/2002 | Kerekes | B29C 67/0059 250/559.2 |
| 2006/0111807 A1* | 5/2006 | Gothait | B29C 67/0059 700/119 |
| 2010/0125356 A1* | 5/2010 | Shkolnik | B29C 67/0088 700/98 |
| 2015/0024233 A1* | 1/2015 | Gunther | G05B 19/41875 428/601 |
| 2015/0045928 A1* | 2/2015 | Perez | B29C 64/112 700/110 |

* cited by examiner

Primary Examiner — James Sanders
(74) Attorney, Agent, or Firm — Maginot Moore & Beck LLP

(57) ABSTRACT

A printer is configured to detect a missing material drop in a top layer of a part being printed in the printer. Upon detection of a missing material drop, the printer moves the platform on which the part is being formed in a direction opposite to the process direction to position the area in which the drop is missing beneath an ejector that is operated to eject a drop in the area. This procedure is performed for each area in which a missing drop was detected before the next layer of the part is formed.

5 Claims, 4 Drawing Sheets

SYSTEM AND METHOD FOR CORRECTING OBJECT DEFECTS FORMED BY A THREE-DIMENSIONAL OBJECT PRINTING SYSTEM

TECHNICAL FIELD

The system and method disclosed in this document relate to printers that produce three-dimensional objects and, more particularly, to the omission of drops in three-dimensional objects produced by such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A portion of a previously known three-dimensional object printing system 10 is shown in FIG. 4. In the view depicted in that figure, a platform 14, called a cart, is configured to ride upon track rails 22 to enable the cart to move in a process direction P between printing stations, such as the printing station 26. Printing station 26 includes four ejector heads 30 as shown in the figure, although fewer or more ejector heads can be used in a printing station. Once the cart 14 reaches the printing station 26, the cart 14 transitions to precision rails 38. Precision rails 38 are cylindrical rail sections that are manufactured within tight tolerances to help ensure accurate placement and maneuvering of the cart 14 beneath the ejector heads 30. Linear electrical motors are provided within housing 42. These motors produce electromagnetic fields that interact with a magnet 46 connected to the lower end of the cart 14 to move the cart along the track rails 22 between stations and to move the cart on the rails 38 within a station 26. Once the cart 14 is beneath the printing station 26, the printheads are operated to eject material in synchronization with the motion of the cart. Additional motors (not shown) move the printing station 26 vertically and in an X-Y plane over the cart to form an object with layers of material ejected by the printheads. Alternatively, a mechanism can be provided to move the cart 14 vertically and in the X-Y plane to enable formation of the object on the cart. Once the printing to be performed by a printing station is finished, the cart 14 is moved along the rails 22 to another printing station for further part formation or for layer curing or other processing.

An end view of the cart 14 on the rails 38 is shown in FIG. 3. At a printing station 26, bearings 34 of the cart 14 are positioned on the precision rails 38 in an arrangement that facilitates accurate positioning of the build platen on the cart 14. Specifically, a pair of bearings 34 are positioned at a right angle to one another on one of the rails 38 to remove four degrees of freedom of the cart 14, while the other bearing 34 rests on the other rail 38 to remove one more degree of freedom. As described above, linear motors in housing 42 operate to interact with a magnet positioned within housing 46 to move the cart 14 over an upper surface 50 of the housing 42. Gravity and magnetic attraction between the motors in the housing and the magnet 46 hold the bearings 34 in contact with the rails 38.

The three-dimensional additive process is performed in a printer in a layer-by-layer manner. To operate the ejectors in the printhead(s) to form a layer, a three-dimensional raster processor receives a file of three-dimensional data of the part to be produced. These three-dimensional part data can be contained in a computer-aided design (CAD) file, for example. The processor uses these data to generate a raster data file, which contains data that correspond to each layer that forms the part. A printhead driver receives the raster data file and generates pixelated data that are used to operate the ejectors in the printhead(s) for the ejection of building and support material onto a support platen to form the part layer by layer. The printhead driver and a printer controller generate signals to coordinate the movement of the platen and the printhead(s) with the operation of the ejectors in the printhead.

During the formation of a layer during part printing, an ejector in an ejector head can malfunction. A malfunctioning ejector includes one that ejects drops of material in a direction other than its intended path, ejects drops that are smaller than expected, or fails to eject material drops at all. Techniques are known for detecting malfunctioning ejectors. If the absence of material drops or the misplacement or reduction in size of the material drops is not corrected, the part can be adversely impacted enough to cause rejection of the part. Since part printing can take hours, the rejection of a part after its production substantially reduces throughput for the system. Therefore, compensating for the absence or loss of material mass at a drop location would be beneficial.

SUMMARY

A printer is configured to compensate for missing or reduced size material drops. The printer includes at least one ejector head having a plurality of ejectors configured to eject a material, a platform configured to move in a process direction past the at least one ejector head and receive material ejected by the at least one ejector head in the print zone, a sensor configured to generate measurements of a top layer of a part formed with material ejected by the at least one ejector head, and a controller operatively connected to the sensor and the at least one ejector head. The controller is configured to operate the at least one ejector head to form a layer of the part, detect missing drops of material in the top layer of a part, and generate signals for moving the cart underneath the ejector head to enable an ejector to eject material into a position in the top layer where a missing drop of material was detected.

A method for operating a printer helps compensate for missing or reduced size material drops. The method includes operating at least one ejector head with a controller to form a layer of a part on a platform of a cart moving in a process direction past the at least one ejector head, detecting with a controller receiving measurement data from a sensor missing drops of material in a top layer of the part, and generating signals for moving the cart underneath the at least one ejector head to enable an ejector to eject material into a position in the top layer where a missing drop of material was detected.

BRIEF DESCRIPTION OF THE DRAWINGS

The foregoing aspects and other features of a printer that helps compensate for missing or reduced size material drops are explained in the following description, taken in connection with the accompanying drawings.

DETAILED DESCRIPTION

Figure 1:
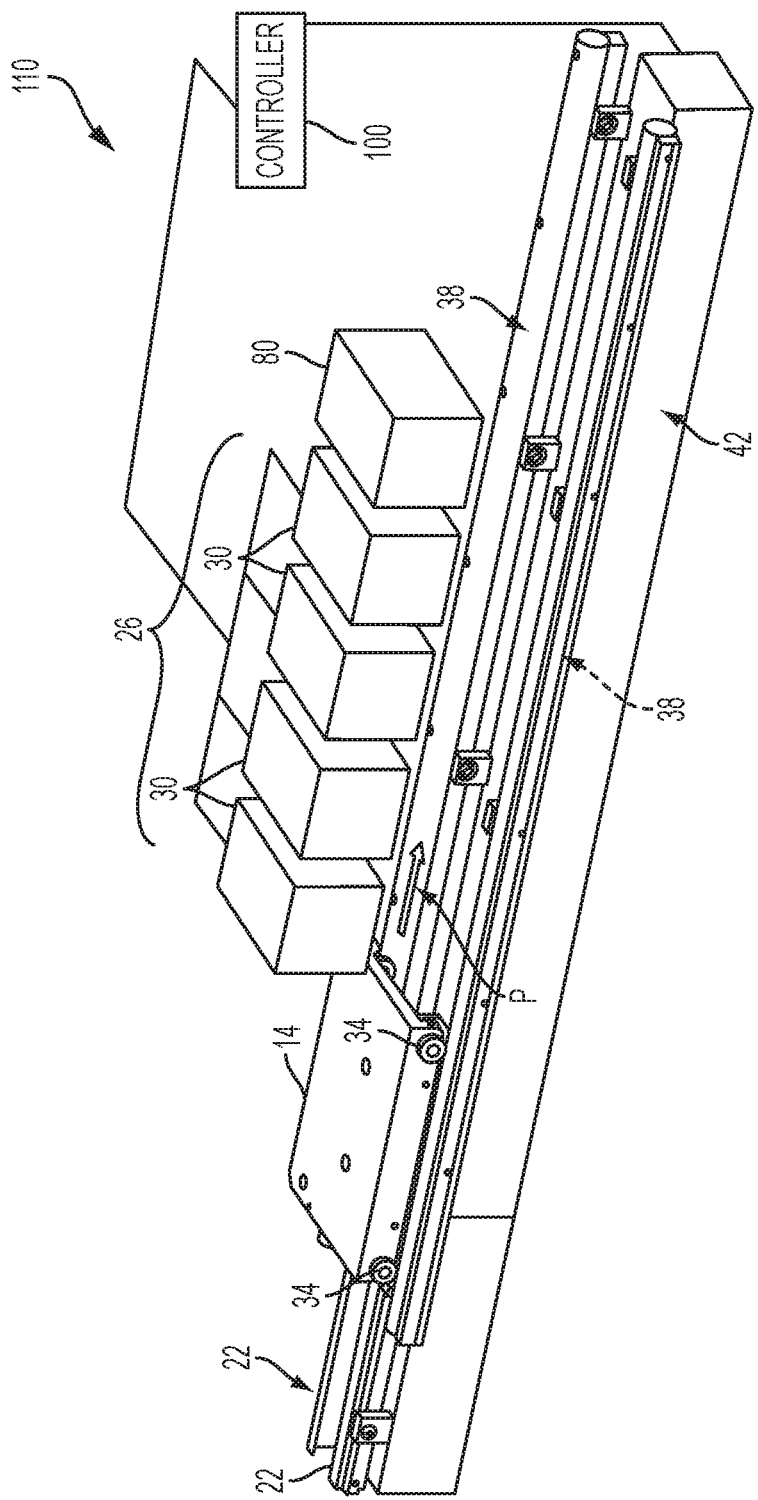
FIG. 1 is a block diagram of a system that operates a three-dimensional printing system to compensate for missing or reduced size material drops.

For a general understanding of the environment for the system and method disclosed herein as well as the details for the system and method, reference is made to the drawings. In the drawings, like reference numerals designate like elements.

Referring to FIG. 1, a three-dimensional printing system 110 includes a platform or cart 14 configured to ride upon track rails 22 that extend from housing 42. The interaction of the motors in the housing 42 with a magnet mounted to the bottom of the cart 14 enables the platform to move on the rails 22 in a process direction P between printing stations, such as the printing station 26. The printing station 26 includes four ejector heads 30 configured to eject material to form a three-dimensional object on the surface of the platform of cart 14. Although four ejector heads are shown, in other embodiments fewer or more ejector heads are used in the printing station.

At the printing station 26, the cart 14 transitions to the precision rails 38. The precision rails 38 are generally parallel to each other and extend through a print zone below the ejector heads 30 of the printing station 26. The electrical motors (not shown) in the housing 42 continue to move the cart 14 as the bearings 34 support the cart on the rails 38. Other motors (not shown) move the ejector heads vertically with reference to the platform of the cart 14 as layers of material accumulate on the platform to form a part. The ejector heads 30, however, are not configured for movement in an X-Y plane that is parallel to the platform of the cart 14. Movement in the X-Y plane is not required since each of the ejector heads 30 is wide enough to cover the platform of the cart 14. The elimination of X-Y plane movement removes a possible source of error in the formation of the part. Once the printing to be performed by a printing station is finished, the cart 14 moves beyond the end of the housing 42 shown in the figure to another set of rails 22 so the cart can move to another printing station, a station for layer curing, or other processing.

The linear electrical motors (not shown) within the housing 42 produce electromagnetic fields that interact with a magnet (not shown) within a lower housing of cart 14 that is close to the housing 42 to enable the interaction of the fields and the magnet to move the cart 14 along the rails 22 between printing stations and to move the cart 14 along the precision rails 38 within a printing station or other processing station.

With continued reference to FIG. 1, a controller 100 is operatively connected to each of the ejector heads 30, a laser measurement device 80, and the motors with housing 42. The controller 100 operates the ejector heads 30 to eject material onto the platform of the cart 14 with reference to digital image data of a part to form the part. After the cart 14 moves past the ejector heads 30 for the formation of a layer of the part, the sensor 80 generates measurements of the top surface of the part. The controller 100 compares these measurement data to the data used to operate the ejector heads 30 and determines whether the layer was formed correctly. If the controller 100 detects that a drop of material was not ejected, then the controller determines that the ejector in one of the ejector heads 30 is malfunctioning. The controller 100 then generates signals that operate the motors in the housing 42 to back the cart beneath one of the ejector heads 30 that has an ejector that aligns with the malfunctioning ejector in the process direction P shown in the figure. This ejector is then operated by the controller 100 to supply the missing drop. This procedure is repeated for each drop detected as being missing from the laser measurements. The controller 100 can then operate the motors in the housing 42 to return the cart to the area underneath the ejector heads for the printing of another layer, which is verified using the laser measurements as noted previously. Once all of the layers to be printed at station 26 have been printed, the controller 100 moves the cart to the next printing or processing station where another controller moves the cart.

Figure 2:
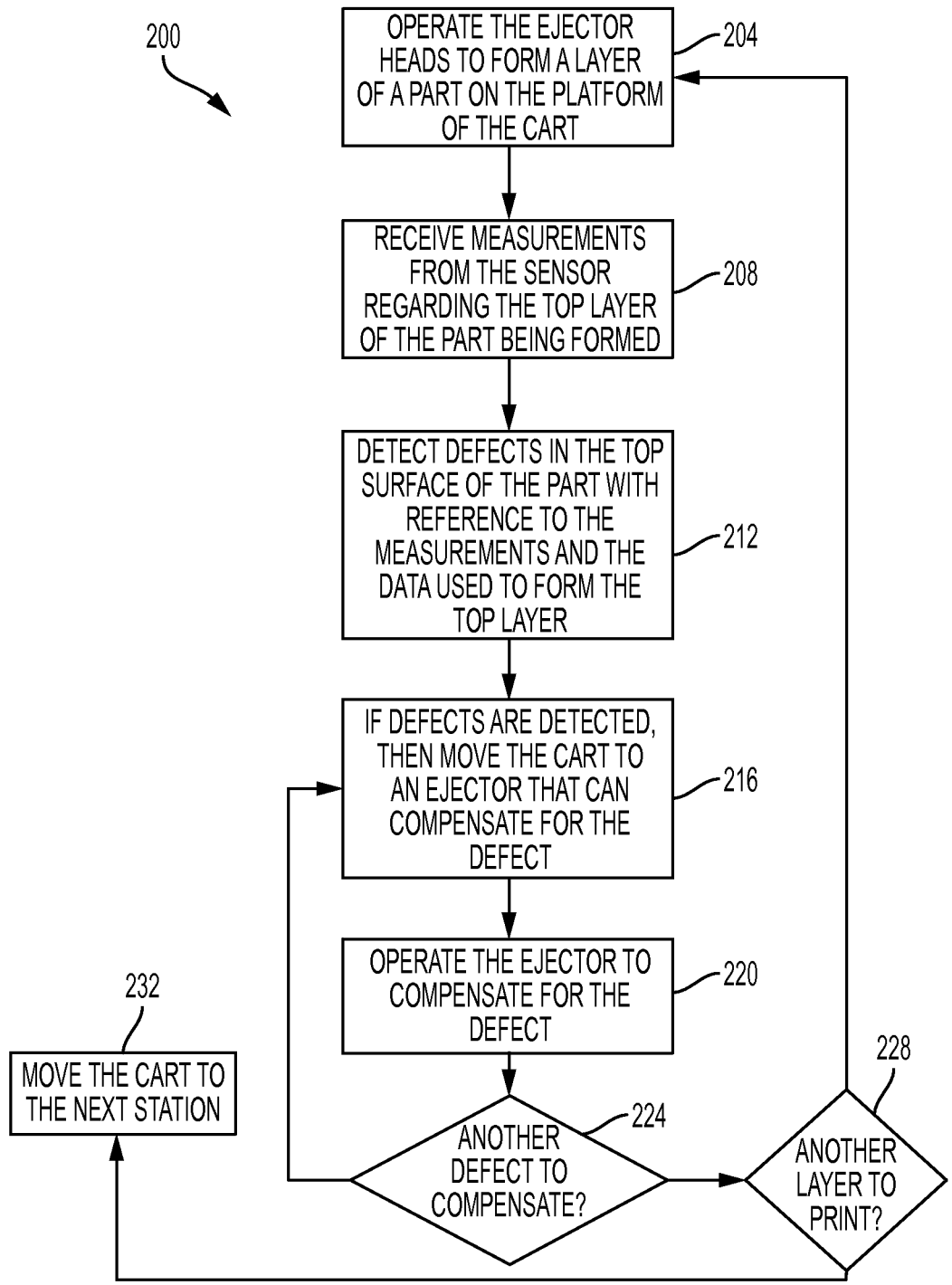
FIG. 2 is a flow diagram of a system that operates a three-dimensional printing system to compensate for missing or reduced size material drops.
Figure 3:
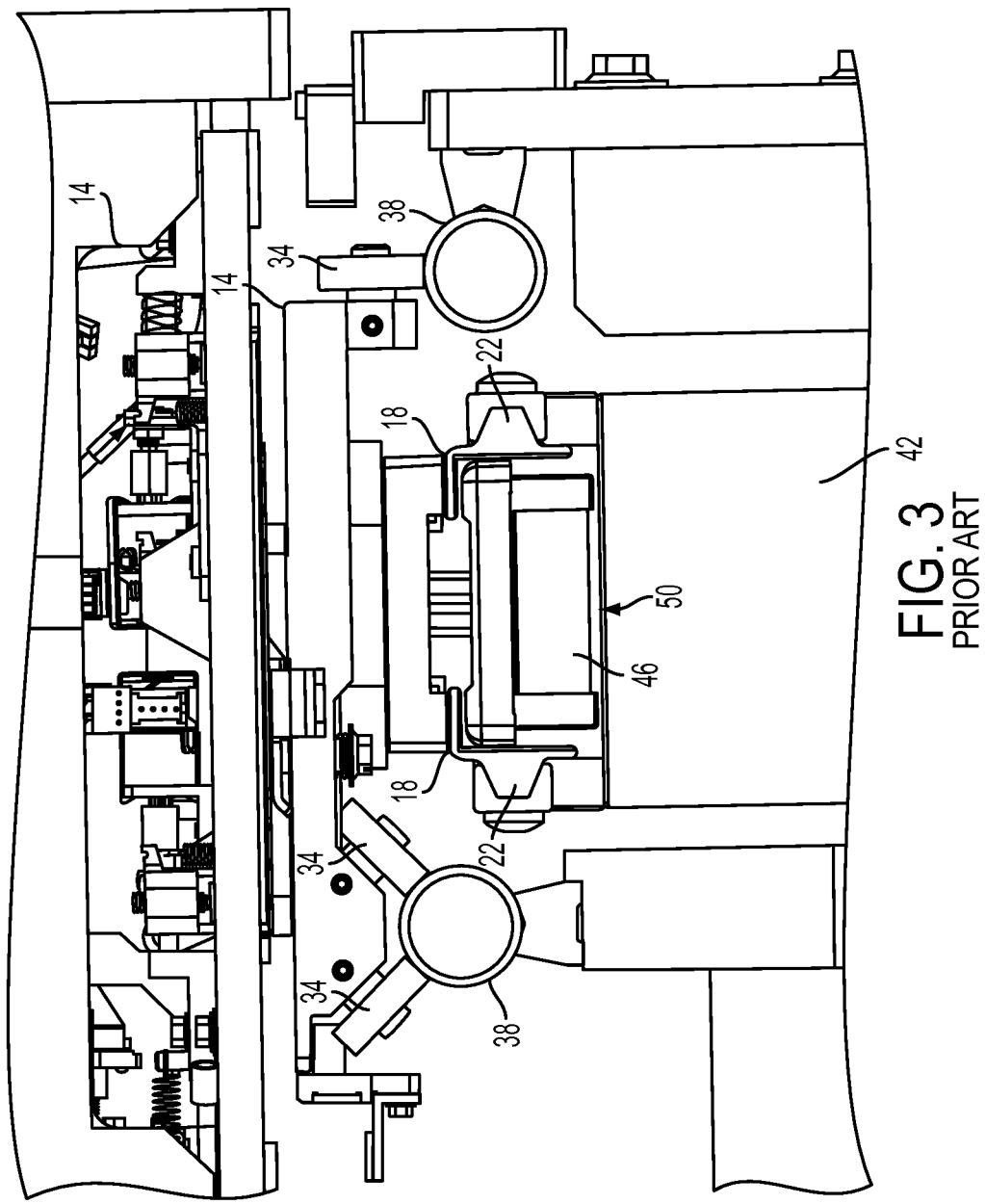
FIG. 3 is a perspective end view of a prior art three-dimensional printing system.
Figure 4:
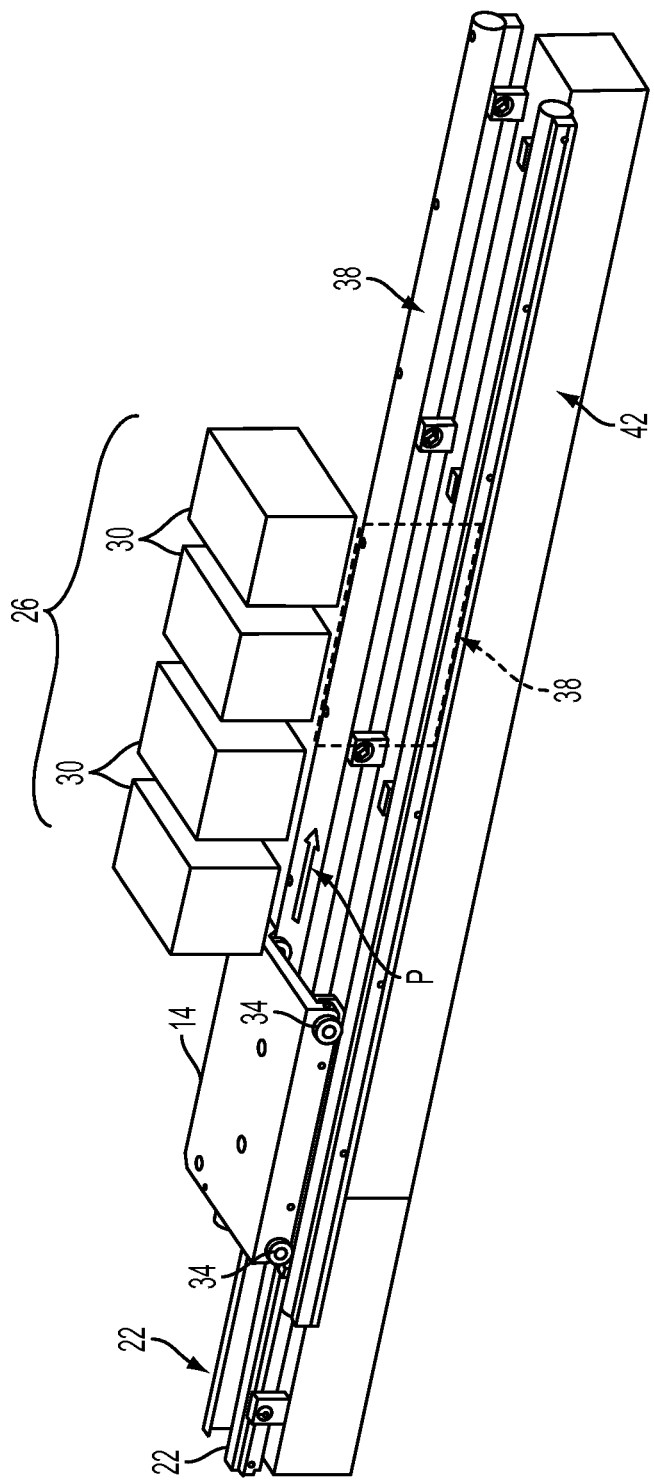
FIG. 4 is a front perspective view of the prior art three-dimensional printing system of FIG. 4.

A method for operating the printer 110 is shown in FIG. 2. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 100 noted above can be such a controller or processor. Alternatively, the controller can be implemented with more than one processor and associated circuitry and components, each of which is configured to form one or more tasks or functions described herein.

The process 200 begins by the controller 100 operating the ejector heads 30 to eject material onto the platform of the cart 14 with reference to digital image data of a part to form the part (block 204). After the cart 14 moves past the ejector heads 30 for the formation of a layer of the part, the sensor 80 generates and sends to the controller measurements of the top surface of the part (block 208). The controller 100 compares these measurement data to the data used to operate the ejector heads 30 and determines whether the layer was formed correctly. If the controller 100 detects that a drop of material was not ejected, then the controller determines that the ejector in one of the ejector heads 30 is malfunctioning. The controller 100 then generates signals that operate the motors in the housing 42 to back the cart beneath one of the ejector heads 30 that has an ejector that aligns with the malfunctioning ejector in the process direction P shown in the figure (block 212). This ejector is then operated by the controller 100 to supply the missing drop (block 216). This procedure is repeated for each drop detected as being missing from the laser measurements (blocks 220). The controller 100 can then operate the motors in the housing 42 to return the cart to the area underneath the ejector heads for the printing of another layer (block 224), which is verified using the laser measurements as noted previously (block 212). Once all of the layers to be printed at station 26 have been printed, the controller 100 moves the cart to the next printing or processing station where another controller moves the cart (block 224).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer comprising:
    at least one ejector head having a plurality of ejectors configured to eject a material;
    a platform configured to move in a process direction past the at least one ejector head and receive material ejected by the at least one ejector head;
    a sensor configured to generate measurements of a top layer of a part formed with material ejected by the at least one ejector head; and
    a controller operatively connected to the sensor and the at least one ejector head, the controller being configured to:
        operate multiple ejectors in the at least one ejector head to form a plurality of layers of the part;
        receive measurements of the top layer of the plurality of layers from the sensor prior to completion of the part;
        detect positions in the top layer of the plurality of layers of the part where at least one drop of material is missing, the positions being detected with reference to the measurements of the top layer of the plurality of layers of the part received by the controller from the sensor;
        identify ejectors in the at least one ejector head that correspond to the positions in the top layer of the part where at least one drop of material is missing; and
        generate signals for moving the platform underneath the ejector head to enable an ejector in the at least one ejector head other than one of the identified ejectors to eject at least one drop of material into the positions in the top layer where at least one drop of material was detected as missing prior to operating the at least one ejector head to form another plurality of layers for the part.

2. The printer of claim 1 wherein the sensor is a laser measurement sensor.

3. The printer of claim 1 wherein the generated signals operate motors to generate electromagnetic fields to interact with a magnet associated with the platform to move the platform in a direction opposite to the process direction.

4. The printer of claim 1, the at least one ejector head further comprising:
    a plurality of ejector heads; and
    the controller being operatively connected to each ejector head in the plurality of ejector heads, the controller being further configured to:
        operate each ejector head in the plurality of ejector heads to form a portion of the plurality of layers of the part; and
        generate signals for moving the platform underneath an ejector head in the plurality of ejector heads other than the ejector head having one of the identified ejectors that failed to eject at least one drop of material into one of the positions where at least one drop of material was detected as missing to enable at least one material drop to be ejected into the one position in the top layer where at least one drop of material was detected as missing.

5. The printer of claim 1, the controller being further configured to:
    compare the measurements received from the sensor to data used by the controller to operate the at least one ejector head to form the plurality of layers of the part; and
    detecting the positions where at least one drop of material is missing with reference to the comparisons made by the controller with the data used to operate the at least one ejector head.

* * * * *